United States Patent
Kambayashi et al.

(10) Patent No.: US 12,241,826 B2
(45) Date of Patent: Mar. 4, 2025

(54) OPTICAL MEASUREMENT INSTRUMENT, SERVER DEVICE, AND OPTICAL MEASUREMENT METHOD

(71) Applicant: Hitachi, Ltd., Tokyo (JP)

(72) Inventors: Takuya Kambayashi, Tokyo (JP);
Toshimitsu Noguchi, Tokyo (JP);
Shunsuke Kono, Tokyo (JP); Akihiro Nojima, Tokyo (JP)

(73) Assignee: Hitachi, Ltd., Tokyo (JP)

(*) Notice: Subject to any disclaimer, the term of this patent is extended or adjusted under 35 U.S.C. 154(b) by 440 days.

(21) Appl. No.: 17/596,051

(22) PCT Filed: Mar. 19, 2020

(86) PCT No.: PCT/JP2020/012480
§ 371 (c)(1),
(2) Date: Dec. 2, 2021

(87) PCT Pub. No.: WO2020/250537
PCT Pub. Date: Dec. 17, 2020

(65) Prior Publication Data
US 2022/0317023 A1 Oct. 6, 2022

(30) Foreign Application Priority Data
Jun. 12, 2019 (JP) ................. 2019-109322

(51) Int. Cl.
*G01N 21/00* (2006.01)
*G01J 1/28* (2006.01)
*G01N 21/03* (2006.01)

(52) U.S. Cl.
CPC ............ *G01N 21/0303* (2013.01); *G01J 1/28* (2013.01); *G01N 2201/0484* (2013.01)

(58) Field of Classification Search
CPC .... G01N 21/0303; G01N 21/01; G01N 21/05; G01N 21/27; G01N 2201/0484; G01N 2201/0162; G01N 2201/0325; G01J 1/28
(Continued)

(56) References Cited

U.S. PATENT DOCUMENTS 8,246,907 B2 * 8/2012 Maeda .................. G16H 10/40
422/63
11,327,086 B2 * 5/2022 Nose ................ G01N 35/00732
(Continued)

FOREIGN PATENT DOCUMENTS
JP 2007-538230 A 12/2007
JP 2014-115268 A 6/2014
(Continued)

OTHER PUBLICATIONS

Japanese-language Office Action issued in Japanese Application No. 2019-109322 dated Nov. 29, 2022 with English translation (10 pages).
(Continued)

*Primary Examiner* — Hoa Q Pham
(74) *Attorney, Agent, or Firm* — Crowell & Moring LLP (57) ABSTRACT

An arithmetic expression used for estimating a target item of a specimen is more easily incorporated into an optical measurement system. An optical measurement instrument includes an optical analysis unit configured to perform an optical analysis on a specimen and measure an intensity of light as a result of the optical analysis, and an arithmetic processing unit configured to download an arithmetic expression from a server device via a network, and perform a quantitative analysis on a target substance contained in the specimen by substituting the result of the optical analysis by the optical analysis unit into the arithmetic expression.

11 Claims, 6 Drawing Sheets

(58) Field of Classification Search
USPC ............... 356/301–326, 432–440, 335–343; 702/123; 436/43
See application file for complete search history.

(56) References Cited

U.S. PATENT DOCUMENTS

| | | |
|---|---|---|
| 2015/0057962 A1 | 2/2015 | Morita |
| 2017/0008259 A1* | 1/2017 | Kanazawa .............. B32B 25/14 |
| 2017/0082591 A1 | 3/2017 | Mori et al. |

FOREIGN PATENT DOCUMENTS

| | | |
|---|---|---|
| JP | 2015-31676 A | 2/2015 |
| JP | 2015-42954 A | 3/2015 |
| JP | 2015-114154 A | 6/2015 |
| JP | 2017-219499 A | 12/2017 |
| WO | WO 2005/116632 A2 | 12/2005 |

OTHER PUBLICATIONS

International Search Report (PCT/ISA/210) issued in PCT Application No. PCT/JP2020/012480 dated Apr. 14, 2020 with English translation (four (4) pages).

Japanese-language Written Opinion (PCT/ISA/237) issued in PCT Application No. PCT/JP2020/012480 dated Apr. 14, 2020 (four (4) pages).

* cited by examiner

| MEASUREMENT DATE AND TIME | REFERENCE DATA $I_0$ | MEASUREMENT DATA $I_1$ | ARITHMETIC RESULT | ARITHMETIC EXPRESSION ID |
|---|---|---|---|---|
| $T_0$ | $I_0$ | — | — | — |
| $T_1$ | — | $I_{11}$ | $C_1$ | .... |
| $T_2$ | — | $I_{12}$ | $C_2$ | .... |
| ⋮ | | | | |

| USER ID | ARITHMETIC EXPRESSION ID | DL DATE AND TIME |
|---|---|---|
| X | ..... | ..... |
| | ..... | ..... |
| | ..... | ..... |
| Y | ..... | ..... |
| | ..... | ..... |
| ... | | |

OPTICAL MEASUREMENT INSTRUMENT, SERVER DEVICE, AND OPTICAL MEASUREMENT METHOD

TECHNICAL FIELD

The present invention relates to an optical measurement instrument, a server device, and an optical measurement method. The invention claims priority of Japanese Patent Application No. 2019-109322, filed on Jun. 12, 2019, and regarding the designated countries that are permitted to be incorporated by reference in the literature, the content of that application is incorporated herein by reference.

BACKGROUND ART

In the related art, there has been known an optical measurement using an optical analysis in which a specimen is irradiated with light, light transmitted through the specimen or light reflected and scattered by the specimen is spectroscopically analyzed, and fluorescence emitted from the specimen is analyzed. According to the optical measurement, a quantitative analysis of a component contained in the specimen can be performed. In particular, a method for performing the spectroscopic analysis on the light transmitted through the specimen can be realized by a relatively simple device, and thus is used in a wide range of fields.

As a technique related to the spectroscopic analysis, for example, PTL 1 describes that "a spectroscopic analyzer that has a function of measuring absorbance of a target specimen, wherein an optical system for measuring the absorbance of the specimen includes: a light transmitting part in which a container for storing the specimen is arranged; an illuminating part including a light source for emitting illumination light to the specimen in the container in the light transmitting part; and a photometry part configured to measure the absorbance of the specimen by dispersing transmitted light from the specimen in the container in the light transmitting part to detect an intensity of each wavelength, wherein the optical system includes a first optical fiber configured to connect the illuminating part and the light transmitting part and guide the illumination light, and wherein a partial polarization characteristic of the illumination light from the light source is eliminated by the first optical fiber to emit it to the specimen as a non-polarization light."

CITATION LIST

Patent Literature

PTL 1: JP-A-2014-115268

SUMMARY OF INVENTION

Technical Problem

In an optical measurement system including the spectroscopic analyzer described in PTL 1, a quantitative analysis is performed on a target substance contained in the specimen by substituting optical information (hereinafter, referred to as optical information) obtained from light transmitted through the specimen into a predetermined arithmetic expression to perform arithmetic.

In addition, the arithmetic expression is created in advance by multivariate analysis, single regression, or the like using a plurality of combinations of the optical information and a true value of the target substance, and in the related art, it is necessary for a user to prepare the expression for each target substance and incorporate it into the optical measurement system.

The invention has been made in view of such a situation, and it is an object of the invention to more easily incorporate an arithmetic expression used for measuring a target substance contained in a specimen into an optical measurement system.

Solution to Problem

The present application includes a plurality of units for solving at least a part of the above problem, and examples thereof are as follows.

In order to solve the above problem, an optical measurement instrument according to one aspect of the invention includes an optical analysis unit configured to perform an optical analysis on a specimen and measure an intensity of light as a result of the optical analysis, and an arithmetic processing unit configured to download an arithmetic expression from a server device via a network, and perform a quantitative analysis on a target substance contained in the specimen by substituting the result of the optical analysis by the optical analysis unit into the arithmetic expression.

Advantageous Effect

According to one aspect of the invention, the arithmetic expression used for estimating a target item of the specimen can be more easily incorporated into the optical measurement system.

Problems, configurations, and effects other than those described above will be clarified with reference to the description of the following embodiments.

BRIEF DESCRIPTION OF DRAWINGS

FIG. 2 shows

DESCRIPTION OF EMBODIMENTS

Hereinafter, a plurality of embodiments of the invention will be described with reference to the drawings. In all the drawings for describing the embodiments, the same members are denoted by the same reference numerals in principle, and repetitive descriptions thereof will be omitted. Further, in the following embodiments, it is needless to say that the components (including element steps and the like) are not always indispensable unless otherwise stated or except a case where the components are apparently indispensable in principle. It is needless to say that expressions "formed of A", "made of A", "having A", and "including A" do not exclude elements other than A unless otherwise stated that A is the only element thereof. Similarly, in the following embodiments, shapes, positional relation, or the like of the components or the like include those substantially approximate or similar to the shapes or the like unless otherwise particularly specified or considered to be obviously excluded in principle.

Figure 1:
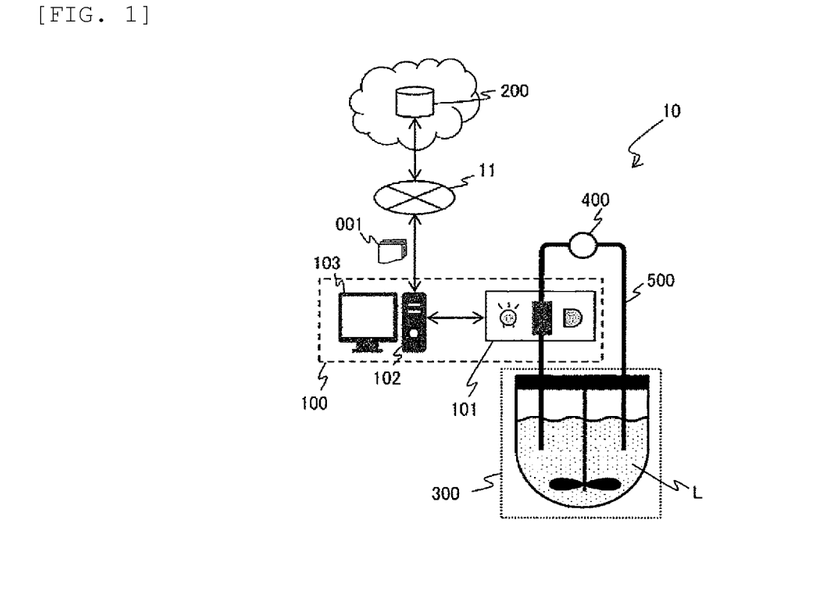
FIG. 1 is a diagram showing a configuration example of an optical measurement system according to a first embodiment of the invention.

Configuration Example of Optical Measurement System 10 According to First Embodiment of the Invention FIG. 1 shows a configuration example of an optical measurement system 10 according to a first embodiment of the invention.

The optical measurement system 10 performs an optical analysis on a specimen L, and performs a quantitative analysis on a target substance contained in the specimen L by substituting optical information obtained as a result into an arithmetic expression 001 and performing arithmetic.

The optical measurement system 10 includes an optical measurement instrument 100 and a server device 200.

The optical measurement instrument 100 includes an optical analysis unit 101, an arithmetic processing unit 102, and a display unit 103.

The optical analysis unit 101 irradiates the specimen L, which is pumped by a pump 400 from a reaction tank 300 and flows into a bypass tube 500, with light, measures a light receiving intensity of a transmitted light thereof, and outputs it to the arithmetic processing unit 102.

Figure 2A:
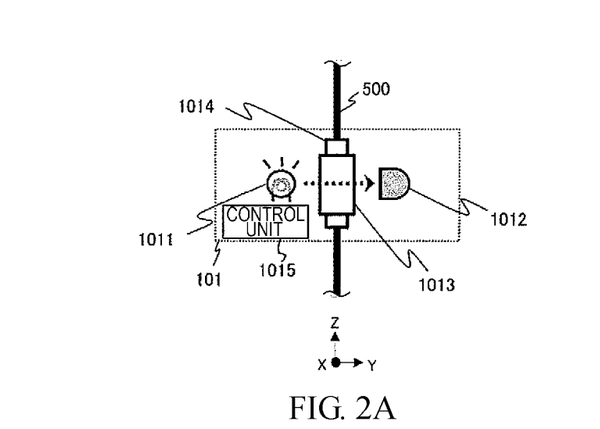
FIGS. 2A and 2B show a configuration example of an optical analysis unit, in which (A) in FIG. 2 is a cross-sectional view of an YZ plane, and (B) in FIG. 2 is a cross-sectional view of an XY plane.
Figure 2B:
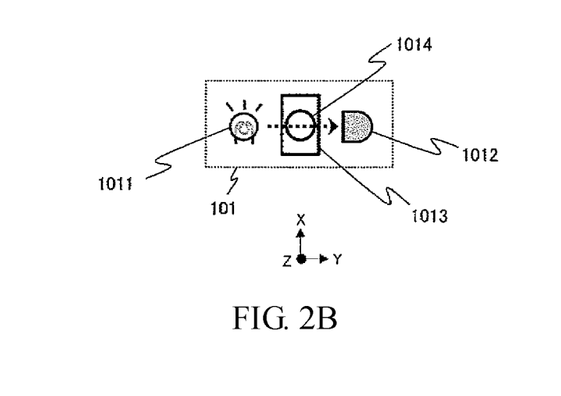

Next, FIG. 2 shows a configuration example of the optical analysis unit 101. (A) in FIG. 2 is a cross-sectional view of an YZ plane of the optical analysis unit 101, and (B) in FIG. is a cross-sectional view of an XY plane of the optical analysis unit 101.

The optical analysis unit 101 includes a light source unit 1011, a light receiving unit 1012, a cell holder 1013, a cell 1014, and a control unit 1015.

The light source unit 1011 includes, for example, a beam generating device, a laser generating device, a light emitting diode (LED), and the like. The light source unit 1011 emits light of a predetermined wavelength to the specimen L flowing into the cell 1014.

The light receiving unit 1012 includes a light receiving element such as a photo diode (PD), a complementary metal-oxide-semiconductor (CMOS) sensor, or the like. The light receiving unit 1012 receives transmitted light emitted from the light source unit 1011 and transmitted through the cell 1014, measures an intensity thereof, and outputs the light to the control unit 1015.

The cell holder 1013 holds and fixes the cell 1014. The cell 1014 has both ends open and is connected to the bypass tube 500 such that the specimen L flowing through the bypass tube 500 passes through the cell 1014.

The control unit 1015 controls an emission timing of light by the light source unit 1011. In addition, the control unit 1015 outputs the intensity of the light transmitted from the light receiving unit 1012 to the arithmetic processing unit 102 as a measurement result of the optical analysis unit 101. Furthermore, the control unit 1015 may control driving of the pump 400. In addition, the control unit 1015 may also serve as the arithmetic processing unit 102.

Return to FIG. 1. The arithmetic processing unit 102 includes, for example, a programmable logic controller (PLC) or a general computer. The PLC includes a processor, a memory, an I/O module, a communication module, and the like. A general computer includes a central processing unit (CPU), a memory, a storage, a communication module, and the like. Each function of the arithmetic processing unit 102, which will be described later, is realized, for example, by executing a program by the processor of the PLC.

The arithmetic processing unit 102 is connected to the server device 200 via a network 11. The network 11 is a bidirectional communication network represented by a local area network (LAN), a wide area network (WAN), the internet, a mobile phone communication network, or the like.

The arithmetic processing unit 102 downloads the arithmetic expression 001 from the server device 200 via the network 11. That is, the arithmetic processing unit 102 requests the server device 200 for the arithmetic expression 001, and receives the arithmetic expression 001 transmitted by the server device 200 in response to this request.

Figure 3:
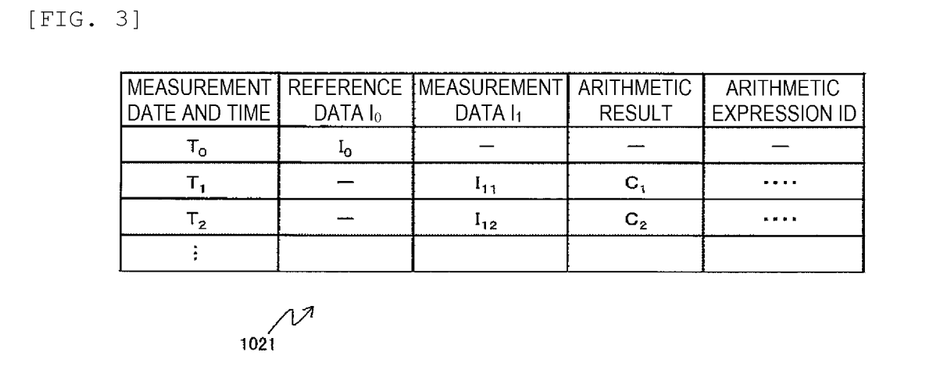
FIG. 3 is a diagram showing an example of a data structure of a measurement record.

In addition, the arithmetic processing unit 102 performs the quantitative analysis on the target substance contained in the specimen L by calculating optical information (described later) from the intensity of the light as a measurement result input from the optical analysis unit 101 and substituting it into the arithmetic expression 001, and causes the display unit 103 to display a result thereof. Further, the arithmetic processing unit 102 can output the result of the quantitative analysis to another device via the network 11. Furthermore, the arithmetic processing unit 102 records and manages measurement information 1021 (FIG. 3).

The display unit 103 includes, for example, a display device such as a liquid crystal display, an organic electro luminescence (EL) display, or the like. The display unit 103 displays the result of the quantitative analysis by the arithmetic processing unit 102.

The server device 200 includes a general computer such as a server computer equipped with a CPU, a memory, a storage, a communication module, and the like, which are present on a cloud network. Each function of the server device 200, which will be described later, is realized by executing a program by the CPU of the general computer.

In the server device 200, a plurality of arithmetic expressions 001 generated in advance for each target substance and its quantitative analysis item are stored in association with identification information (an arithmetic expression ID). The arithmetic expression 001 is created in advance by multivariate analysis, single regression, or the like using a plurality of combinations of the optical information and a true value of the item of the quantitative analysis of the target substance. The server device 200 transmits the arithmetic expression 001 to the optical measurement instrument 100 in response to a request from the optical measurement instrument 100. In addition, the server device 200 records and manages arithmetic expression DL information 201 (FIG. 4) representing a download history of the arithmetic expression 001 by the optical measurement instrument 100.

The specimen L including a target substance to be subjected to optical measurement is accommodated in the reaction tank 300. Both ends of the bypass tube 500 including the pump 400 are intubated in the middle of the reaction tank 300. The specimen L in the reaction tank 300 is sucked from one end of the bypass pipe 500 when the pump 400 is driven, subjected to the optical measurement while passing through the bypass tube 500, and returned to the reaction tank 300 from the other end of the bypass pipe 500.

Next, FIG. 3 shows an example of a data structure of the measurement information 1021 managed by the arithmetic processing unit 102.

A measurement date and time, reference data, measurement data, an arithmetic result, and the arithmetic expression ID are recorded in the measurement information 1021. A measurement time is a date and time when the reference data or the measurement data is measured. The reference data is an intensity of light (reference light) measured in a state where the specimen L is not flowing into the cell 1014. The measurement data is an intensity of light (measurement light) measured in a state where the specimen L is flowing into the cell 1014. The arithmetic result is a result of the quantitative analysis obtained by substituting the reference data and the measurement data into the arithmetic expression 001. The arithmetic expression ID is identification information of the arithmetic expression 001 used for the quantitative analysis.

The measurement information 1021 is referred to, for example, when a change with time of the measurement result is displayed on the display unit 103.

Figure 4:
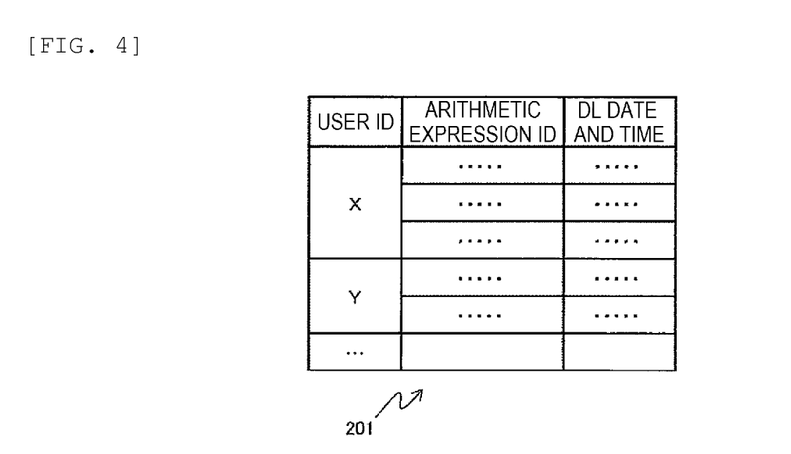
FIG. 4 is a diagram showing an example of a data structure of an arithmetic expression DL record.

Next, FIG. 4 shows an example of a data structure of the arithmetic expression DL information 201 managed by the server device 200.

The arithmetic expression ID and a DL date and time are recorded in the arithmetic expression DL information 201 in association with a user ID. The user ID is identification information of a user (or a company or the like) of the optical measurement instrument 100 that downloads the arithmetic expression 001. The user ID is notified when the optical measurement instrument 100 requests the server device 200 for the arithmetic expression 001. The arithmetic expression ID is identification information of the downscaled arithmetic expression 001. The DL date and time is a date and time when the arithmetic expression 001 is downloaded.

The arithmetic expression DL information 201 is used for, for example, a case where the user of the optical measurement instrument 100 is charged according to the number of the downloaded arithmetic expression 001, or a case where the user of the optical measurement instrument 100 is notified of the update of the downloaded arithmetic expression 001.

In addition, the arithmetic expression DL information 201 can be viewed from the arithmetic processing unit 102. However, not all the information of the arithmetic expression DL information 201 can be viewed, only records related to users of the arithmetic processing unit 102 can be viewed, and records related to other users cannot be viewed.

<Principle of Quantitative Analysis>

Next, the principle of the quantitative analysis will be described. For example, when the concentration of a target substance z contained in the specimen L is quantitatively analyzed by spectroscopic analysis, the Lambert-Beer law shown by the following expression (1) is used. The Lambert-Beer law represents a relationship between the optical information and a concentration c of the target substance z.

$$A = -\log(I_1/I_0) = \varepsilon c l \quad (1)$$

Here, A represents an amount (an absorbance) of the light emitted from the light source unit 1011 absorbed in the specimen L, and corresponds to the optical information described above. $I_0$ is an intensity of the reference light that does not pass through the specimen L, and corresponds to the reference data described above. $I_1$ is an intensity of the measurement light that has passed through the specimen L, and corresponds to the measurement data described above. $\varepsilon$ is an absorption coefficient of the target substance z contained in the specimen L. c is the concentration of the target substance z contained in the specimen L. l is a distance where the light emitted from the light source unit 1011 passes through the specimen L.

In the quantitative analysis by the arithmetic processing unit 102, the reference data $I_0$ and the measurement data $I_1$ are substituted into the arithmetic expression 001 including the absorption coefficient $\varepsilon$ to obtain the concentration c of the target substance z.

<Measurement Processing by Optical Measurement System 10>

Figure 5:
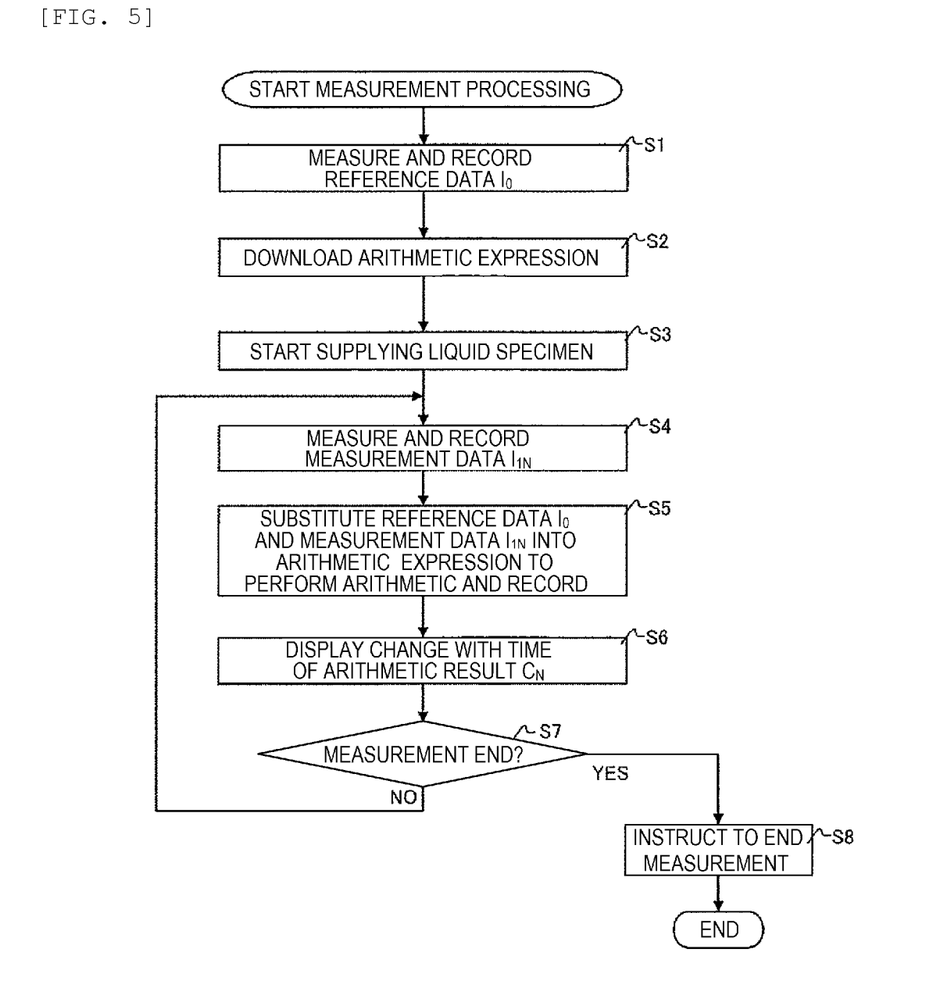
FIG. 5 is a flow chart illustrating an example of measurement processing according to the first embodiment.

Next, FIG. 5 is a flow chart illustrating an example of measurement processing by the optical measurement system 10.

This measurement processing is started, for example, in response to a predetermined start command from the user to the arithmetic processing unit 102.

First, in accordance with a measurement start instruction from the arithmetic processing unit 102, the optical analysis unit 101 measures the reference data $I_0$, and the arithmetic processing unit 102 records the reference data $I_0$ in the measurement information 1021 (step S1). Specifically, the light source unit 1011 emits light in a state where the specimen L is not flowing into the cell 1014, and the light receiving unit 1012 receives reference light transmitted through an empty cell 1014, and outputs the reference data $I_0$ indicating the intensity thereof to the arithmetic processing unit 102. Then, the arithmetic processing unit 102 records the reference data $I_0$ in the measurement information 1021 in association with a measurement date and time TN.

Next, the arithmetic processing unit 102 downloads the arithmetic expression 001 according to the target substance z and the item (the concentration or the like) of the quantitative analysis from the server device 200 (step S2). Specifically, for example, the arithmetic processing unit 102 is connected to the server device 200 via the network 11, receives selection of the target substance z and the item of the quantitative analysis from the user, requests the arithmetic expression 001 according to the selection of the user, and receives the arithmetic expression 001 transmitted by the server device 200 in response to the request.

Next, the pump 400 is driven according to the control from the control unit 1015, and starts the flow of the specimen L into the bypass tube 500 (step S3). As a result, the specimen L is also flowed into the cell 1014.

Next, the optical analysis unit 101 measures measurement data $I_{1N}$ (N=1, 2, ...), and the arithmetic processing unit 102 records the measurement data $I_{1N}$ in the measurement information 1021 (step S4). Specifically, the light source unit 1011 emits light to the cell 1014 into which the specimen L is flowing, and the light receiving unit 1012 receives the measurement light transmitted through the cell 1014, and outputs the measurement data $I_{1N}$ indicating the intensity thereof to the arithmetic processing unit 102. Then, the arithmetic processing unit 102 records the measurement data $I_{1N}$ in the measurement information 1021 in association with the measurement date and time TN.

Next, the arithmetic processing unit 102 substitutes the reference data $I_0$ and the measurement data $I_{1N}$ into the arithmetic expression 001 to perform arithmetic, and records arithmetic result CN corresponding to the result of the quantitative analysis (the concentration c or the like) of the target substance z in the measurement information 1021 in association with the measurement date and time TN (step S5).

Next, the arithmetic processing unit 102 causes the display unit 103 to display a display screen showing a change with time of the arithmetic result CN based on the measurement date and time TN and the arithmetic result CN of the measurement information 1021 (step S6).

Next, the arithmetic processing unit 102 determines whether the measurement ends according to, for example, the presence or absence of a predetermined end command from the user (step S7). Here, when the arithmetic processing unit 102 determines that the measurement does not end (NO in step S7), the processing returns to step S4, and steps S4 to S7 are repeated. As a result, a newly measured arithmetic result CN is additionally displayed on the display screen of the display unit 103.

On the contrary, when the arithmetic processing unit 102 determines that the measurement ends (YES in step S7), instructs the optical analysis unit 101 to end the measurement (step S8). Accordingly, in the optical analysis unit 101, the driving of the pump 400 is stopped, and the emission of the light by the light source unit 1011 and the reception of the measurement light by the light receiving unit 1012 are ended. Thus, the measurement processing is ended.

According to the measurement processing described above, since the arithmetic expression 001 required for the quantitative analysis of the target substance z can be downloaded from the server device 200, the arithmetic expression 001 can be easily incorporated into the optical measurement system 10 as compared with the related art.

In addition, the order of steps in the measurement processing described above is not limited to the example described above. For example, the order of step S1 and step S2 may be reversed such that the arithmetic expression 001 is downloaded, and then the reference data $I_0$ is measured and recorded.

In addition, the number of the arithmetic expression 001 to be downloaded in step S2 is not limited to 1, and a plurality of arithmetic expressions 001 may be downloaded. In this case, the concentration c of the target substance z is calculated using the plurality of downloaded arithmetic expressions 001, and the user is made to select the one with the highest measurement accuracy from the obtained plurality of arithmetic results. After that, an arithmetic expression corresponding to the selected arithmetic result is adopted, arithmetic expressions corresponding to the unselected arithmetic results are discarded, and the server device 200 is notified that the arithmetic expression has been discarded. According to this notification, for example, in a case where the user is charged in according to the download number of the arithmetic expression, it is possible to prevent the discarded arithmetic expression from being charged. In addition, for example, an arithmetic expression that is not discarded can be evaluated as an arithmetic expression with high measurement accuracy.

Figure 6A:
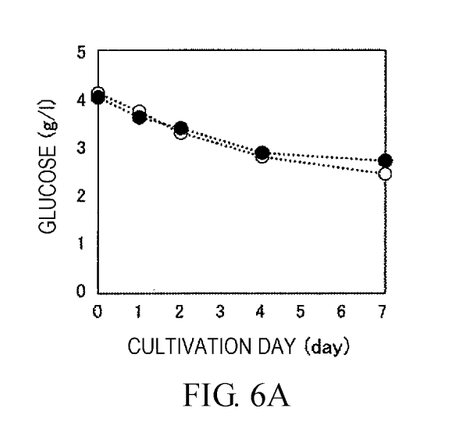
FIGS. 6A and 6B are diagrams illustrating effects of the measurement processing, in which (A) in FIG. 6 is a measurement result when a target substance is glucose, and (B) in FIG. 6 is a diagram showing a measurement result when the target substance is a lactic acid.
Figure 6B:
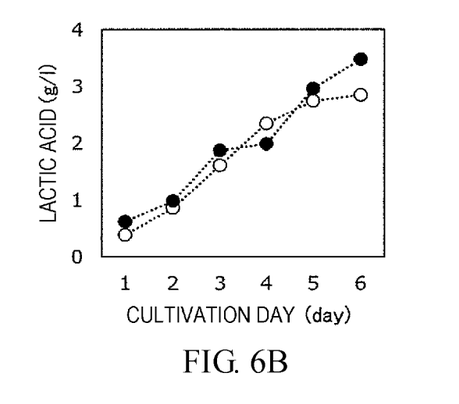

FIG. 6 is a diagram illustrating effects of the measurement processing described above. (A) in FIG. 6 shows a change with time when the concentration of glucose contained in the culture solution of a Chinese hamster ovary (CHO) cell, which is a kind of animal cell, is measured. (B) in FIG. 6 shows a change with time when the concentration of a lactic acid contained in the culture solution is measured. In addition, in (A) and (B) in FIG. 6, values indicated by white circles are true values measured by using another measurement instrument, and values indicated by black circles are arithmetic values by the measurement processing.

In addition, the arithmetic expression 001 was created by using a true value obtained by measuring the concentrations of the glucose and the lactic acid contained in the CHO culture solution using BioPAT Trace (manufactured by sartorius) and optical information obtained by measuring the CHO culture solution using a commercially available spectroscopic analyzer (Martix-F (manufactured by Bruker)), and by using a commercially available multivariate analysis software (The Unscrambler X (manufactured by CAMO)).

In both (A) and (B) in FIG. 6, it can be seen that the arithmetic values (the black circles) show the same tendency as the true values (the white circles), and the changes with time in the concentrations of the glucose and the lactic acid can be quantitatively analyzed by the measurement processing described above. In addition, the arithmetic values (the black circles) in (A) and 6(B) in FIG. 6 are results obtained by substituting the same optical information into different arithmetic expressions, which suggests that the quantitative analyses of a plurality of target substances can be performed by changing only the arithmetic expression and using the same optical information.

Configuration Example of Optical Measurement System 20 According to Second Embodiment of Invention Next, an optical measurement system 20 (not shown) according to a second embodiment of the invention will be described. The optical measurement system 20 according to the second embodiment of the invention is obtained by changing the internal configuration of the optical analysis unit 101 of the optical measurement system 10 (FIG. 1) according to the first embodiment, and the optical measurement system 20 is the same as the optical measurement system 10 except for the optical analysis unit 101.

Figure 7:
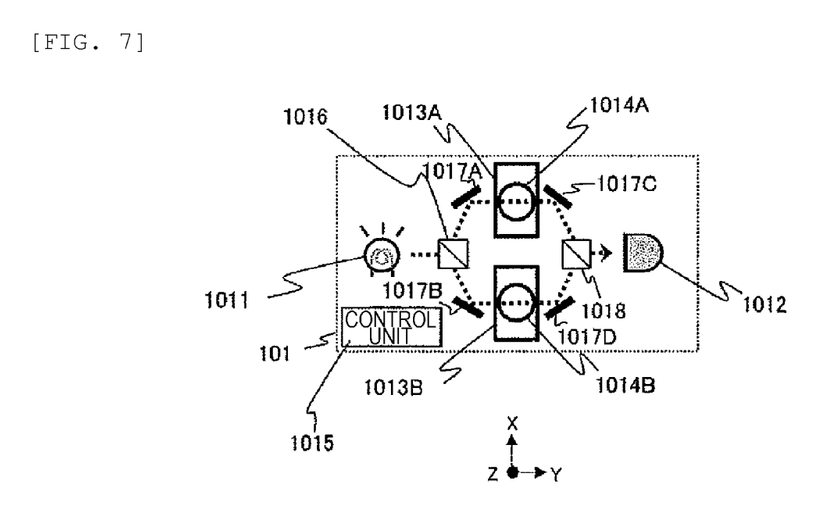
FIG. 7 is a cross-sectional view of an XY plane showing a configuration example of an optical analysis unit in an optical measurement system according to a second embodiment of the invention.

FIG. 7 is a cross-sectional view of an XY plane showing a configuration example of the optical analysis unit 101 in the optical measurement system 20.

The configuration example of the optical analysis unit 101 in the optical measurement system 20 includes the light source unit 1011, the light receiving unit 1012, cell holders 1013A and 1013B, cells 1014A and 1014B, the control unit 1015, a direction conversion element 1016, mirrors 1017A to 1017D, and a direction conversion element 1018.

In addition, among the components of the optical analysis unit 101 in the optical measurement system 20, those that are common to the components of the optical analysis unit 101 (FIG. 2) in the optical measurement system 10 are designated by the same reference numerals and the description thereof will be omitted.

The cell holder 1013A holds and fixes the cell 1014A. However, the bypass tube 500 is not connected to the cell 1014A, and the specimen L is not flowing through the cell 1014A. The cell holder 1013B holds and fixes the cell 1014B. The cell 1014B has both ends open and is connected to the bypass tube 500 such that the specimen L flowing through the bypass tube 500 passes through the cell 1014B.

The direction conversion elements 1016 and 1018 include, for example, a flip mount and a mirror. The direction conversion element 1016 switches a traveling direction of the light emitted from the light source unit 1011 to the mirror 1017A side or the mirror 1017B side according to the control from the control unit 1015. The direction conversion element 1018 switches a light receiving direction of the light reflected toward the light receiving unit 1012 to the mirror 1017C side or the mirror 1017D side according to the control from the control unit 1015. That is, the direction conversion element 1018 reflects light from the mirror 1017C or the mirror 1017D to the light receiving unit 1012.

The light emitted from the light source unit 1011 and reflected toward the mirror 1017A by the direction conversion element 1016 is reflected by the mirror 1017A, is transmitted through the cell 1014A, is reflected toward the direction conversion element 1018 by the mirror 1017C, and is then reflected toward the light receiving unit 1012 by the direction conversion element 1018.

Meanwhile, the light emitted from the light source unit 1011 and reflected toward the mirror 1017B by the direction conversion element 1016 is reflected by the mirror 1017B, is transmitted through the cell 1014B, is reflected toward the direction conversion element 1018 by the mirror 1017D, and is then reflected toward the light receiving unit 1012 by the direction conversion element 1018.

The control unit 1015 in this configuration example also controls the direction conversion elements 1016 and 1018.

<Measurement Processing by Optical Measurement System 20>

Figure 8:
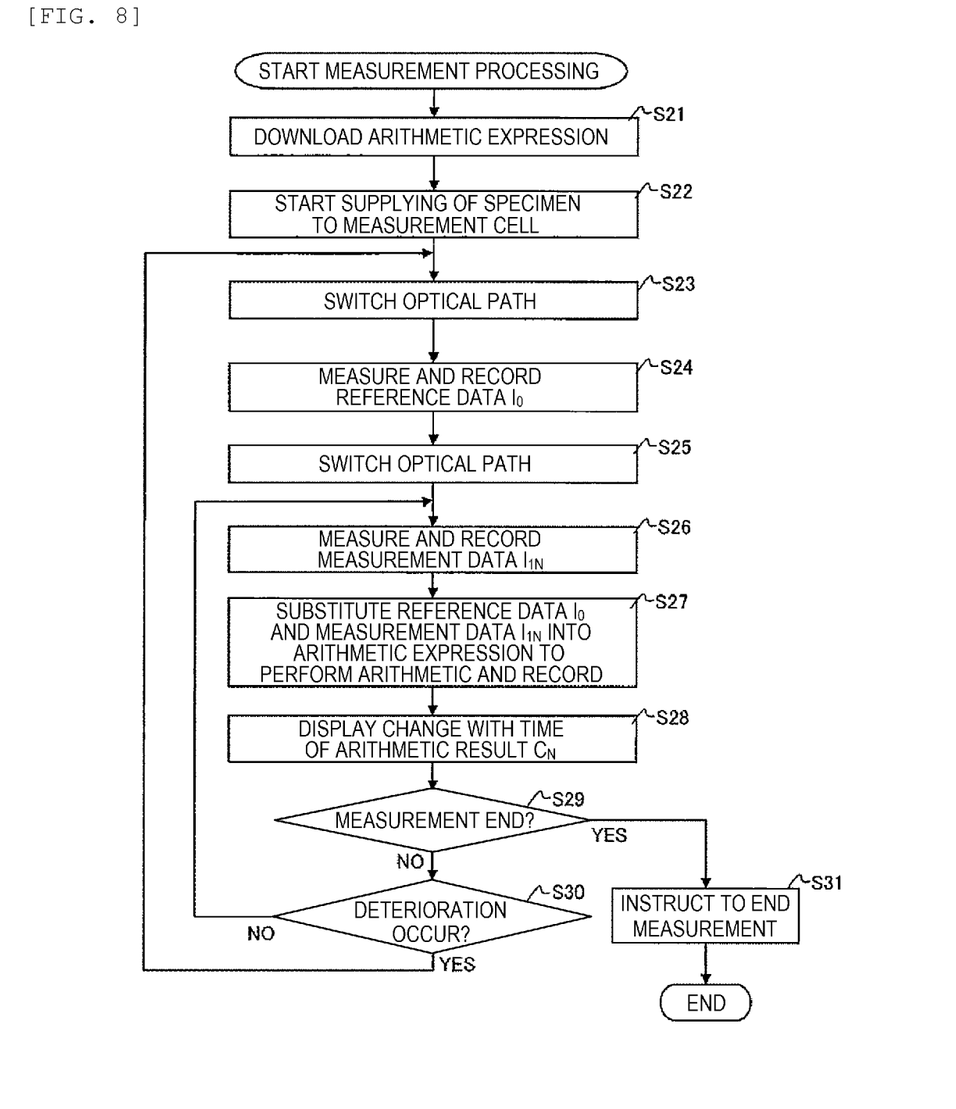
FIG. 8 is a flow chart illustrating an example of measurement processing according to the second embodiment.

Next, FIG. 8 is a flow chart illustrating an example of measurement processing by the optical measurement system 20.

This measurement processing is started, for example, in response to a predetermined start command from the user to the arithmetic processing unit 102.

First, the arithmetic processing unit 102 downloads the arithmetic expression 001 according to the target substance z and the item (the concentration or the like) of the quantitative analysis from the server device 200 (step S21). Specifically, for example, the arithmetic processing unit 102 is connected to the server device 200 via the network 11, receives selection of the target substance z and the item of the quantitative analysis from the user, requests the arithmetic expression 001 according to the selection of the user, and receives the arithmetic expression 001 transmitted by the server device 200 in response to the request.

Next, the pump 400 is driven according to the control from the control unit 1015, and starts the flow of the specimen L into the bypass tube 500 (step S22). As a result, the specimen L is also flowed into the cell 1014B.

Next, the direction conversion element 1016 switches the traveling direction of the light emitted from the light source unit 1011 to the mirror 1017A side according to the control from the control unit 1015. At the same time, the direction conversion element 1018 switches the light receiving direction of the light reflected toward the light receiving unit 1012 to the mirror 1017C side according to the control from the control unit 1015 (step S23).

Next, the optical analysis unit 101 measures the reference data $I_0$, and the arithmetic processing unit 102 records the reference data $I_0$ in the measurement information 1021 (step S24). Specifically, the light source unit 1011 emits light. The emitted light is reflected by the direction conversion element 1016 and the mirror 1017A, and is transmitted through the empty cell 1014A into which the specimen L is not flowing. Then, the light receiving unit 1012 receives reference light transmitted through the empty cell 1014A, and outputs the reference data $I_0$ indicating the intensity thereof to the arithmetic processing unit 102. Then, the arithmetic processing unit 102 records the reference data $I_0$ in the measurement information 1021 in association with the measurement date and time TN.

Next, the direction conversion element 1016 switches the traveling direction of the light emitted from the light source unit 1011 to the mirror 1017B side according to the control from the control unit 1015. At the same time, the direction conversion element 1018 switches the light receiving direction of the light reflected toward the light receiving unit 1012 to the mirror 1017D side according to the control from the control unit 1015 (step S25).

Next, the optical analysis unit 101 measures the measurement data $I_{1N}$ (N=1, 2, . . . ), and the arithmetic processing unit 102 records the measurement data $I_{1N}$ in the measurement information 1021 (step S26). Specifically, the light source unit 1011 emits light. The emitted light is reflected by the direction conversion element 1016 and the mirror 1017B, and is transmitted through the empty cell 1014B into which the specimen L is flowing. Then, the light receiving unit 1012 receives the measurement light transmitted through the cell 1014B into which the specimen L is flowing, and outputs the measurement data $I_{1N}$ indicating the intensity thereof to the arithmetic processing unit 102. Then, the arithmetic processing unit 102 records the measurement data $I_{1N}$ in the measurement information 1021 in association with the measurement date and time TN.

Next, the arithmetic processing unit 102 substitutes the reference data $I_0$ and the measurement data $I_{1N}$ into the arithmetic expression 001 to perform arithmetic, and records the arithmetic result CN corresponding to the result of the quantitative analysis (the concentration c or the like) of the target substance z in the measurement information 1021 in association with the measurement date and time TN (step S27).

Next, the arithmetic processing unit 102 causes the display unit 103 to display a display screen showing a change with time of the arithmetic result CN based on the measurement date and time TN and the arithmetic result CN of the measurement information 1021 (step S28).

Next, the arithmetic processing unit 102 determines whether the measurement ends according to, for example, the presence or absence of a predetermined end command from the user (step S29). Here, when the arithmetic processing unit 102 determines that the measurement does not end (NO in step S29), the control unit 1015 determines whether deterioration (for example, a decrease in the light amount of the light source unit 1011 or sensitivity deterioration of the light receiving unit 1012, or the like) occurs in at least one of the light source unit 1011 and the light receiving unit 1012 based on the measurement data $I_{1N}$ sequentially input from the light receiving unit 1012 (step S30). Here, when the control unit 1015 determines that the deterioration has occurred (YES in step S30), the processing returns to step S23, and step S23 and the subsequent steps are repeated. That is, after the reference data $I_0$ is measured and recorded again, the quantitative analysis of the target substance z is performed, and the display screen showing the change with time of the arithmetic result CN is updated.

On the contrary, when the control unit 1015 determines that the deterioration has not occurred (NO in step S30), the processing returns to step S26, and step S26 and the subsequent steps are repeated. That is, the quantitative analysis of the target substance z is performed using the same reference data $I_0$ as the previous time, and the display screen showing the change with time of the arithmetic result CN is updated.

Then, when the arithmetic processing unit 102 determines that the measurement ends (YES in step S29), instructs the optical analysis unit 101 to end the measurement (step S31). Accordingly, in the optical analysis unit 101, the driving of the pump 400 is stopped, and the emission of the light by the light source unit 1011 and the reception of the measurement light by the light receiving unit 1012 are ended. Thus, the measurement processing is ended.

According to the measurement processing described above, the same effects as the measurement processing described with reference to FIG. 5 can be obtained.

In addition, when the deterioration of at least one of the light source unit 1011 and the light receiving unit 1012 is detected, since the reference data $I_0$ is measured again, the accuracy of the quantitative analysis of the target substance z can be maintained.

In addition, not only in the case where it is determined in step S30 that the deterioration has occurred, the processing may be periodically returned to step S23, and the reference data $I_0$ may be measured and recorded again.

In the measurement processing described above, the order of steps may be changed as in the measurement processing described with reference to FIG. 5. In addition, a plurality of arithmetic expressions 001 may be downloaded.

Figure 9:
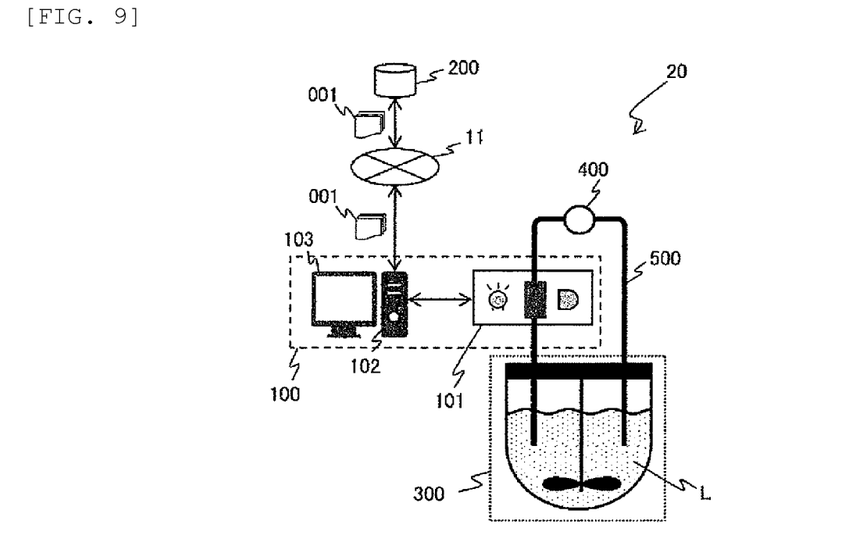
FIG. 9 is a diagram showing a configuration example of an optical measurement system according to a third embodiment of the invention.

Configuration Example of Optical Measurement System 30 According to Third Embodiment of Invention Next, FIG. 9 shows a configuration example of an optical measurement system 30 according to a third embodiment of the invention.

The optical measurement system 30 is different from the optical measurement system 10 (FIG. 1) in the arrangement of the server device 200. The server device 200 in the optical measurement system 10 exists on the cloud network, but the server device 200 in the optical measurement system 30 is arranged on a remote system to which the arithmetic processing unit 102 can be connected via the network 11.

According to the optical measurement system 30, the arithmetic processing unit 102 can download the same arithmetic expression 001 as the arithmetic expression 001 used in the remote system from the server device 200 via the network 11, and can be used for the quantitative analysis of the target substance.

Figure 10:
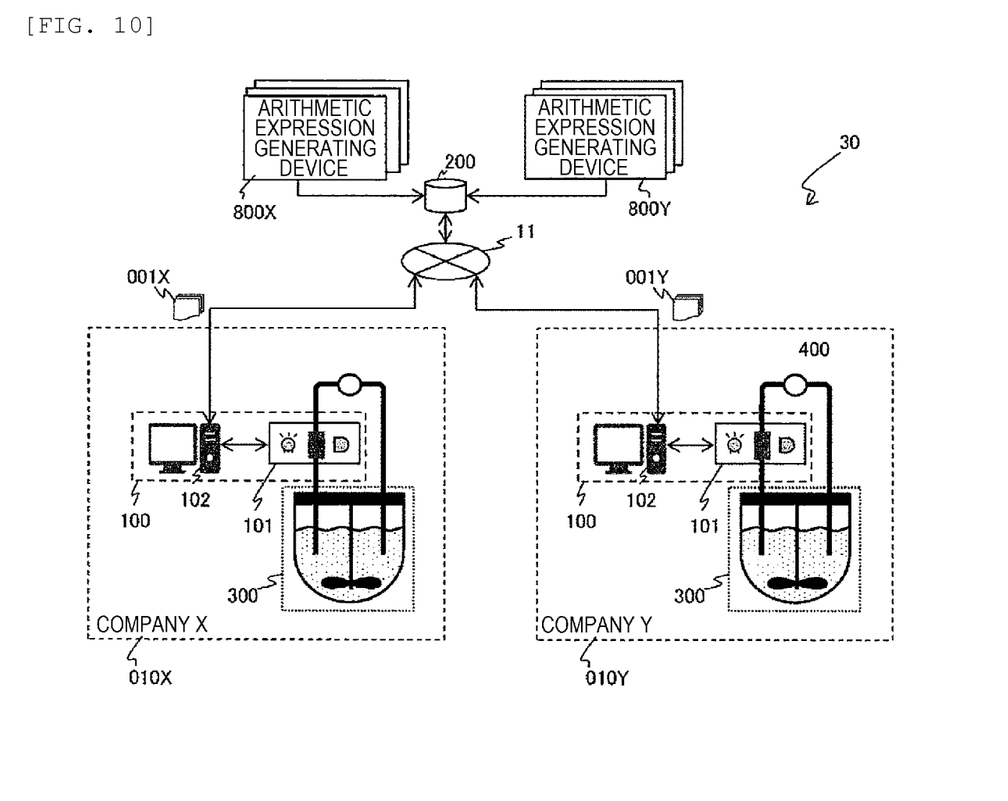
FIG. 10 is a diagram showing a configuration example of an optical measurement system according to a fourth embodiment of the invention.

Configuration Example of Optical Measurement System 40 According to Fourth Embodiment of the Invention Next, FIG. 10 shows a configuration example of an optical measurement system 40 according to a fourth embodiment of the invention.

The optical measurement system 40 includes a measurement site 010X installed in a company X, a measurement site 010Y installed in a company Y, the server device 200, an arithmetic expression generating device 800X, and an arithmetic expression generating device 800Y.

Measurement sites 010X and 010Y each have the optical measurement instrument 100 and the reaction tank 300 similar to those of the optical measurement system 10 or the optical measurement system 20.

A plurality of arithmetic expression generating devices 800X operated by a vendor that generates an arithmetic expression 001X for the company X are connected to the server device 200. In addition, a plurality of arithmetic expression generating devices 800Y operated by a vendor that generates an arithmetic expression 001Y for a company Y are connected to the server device 200. In addition, the arithmetic expression generating devices 800X and 800Y may generate a versatile arithmetic expression 001 instead of generating only the arithmetic expression 001 for a specific company.

The server device 200 can store the arithmetic expression 001X for the company X uploaded from the arithmetic expression generating device 800X in an area accessible only by the arithmetic processing unit 102 of the measurement site 010X, and can cause the arithmetic processing unit 102 of the measurement site 010X to download the arithmetic expression 001X for the company X. In addition, the server device 200 can store the arithmetic expression 001Y for the company Y uploaded from the arithmetic expression generating device 800Y in an area accessible only by the arithmetic processing unit 102 of the measurement site 010Y, and can cause the arithmetic processing unit 102 of the measurement site 010Y to download the arithmetic expression 001Y for the company Y.

In addition, the server device 200 of the optical measurement system 40 also manages the arithmetic expression DL information 201 (FIG. 4) representing a download history of the arithmetic expressions 001X and 001Y. However, the arithmetic expression DL information 201 is managed, for example, such that the download history of the arithmetic expression 001X by the company X cannot be viewed by the company Y, and the download history cannot be viewed by other users (other companies).

The measurement processing by each of the measurement sites 010X and 010Y is the same as the measurement processing described above with reference to FIG. 5 or FIG. 8, and thus the description thereof will be omitted.

According to the optical measurement system 40 described above, the arithmetic expressions for a plurality of different measurement sites can be stored by the same server device 200, and the arithmetic expression DL information 201 representing the download history can be managed in a state of being concealed from other users (other companies).

The invention is not limited to the embodiments and modified examples described above, and includes various modified examples. For example, the invention can be applied not only to a case where a spectroscopic analysis is performed as in the first to fourth embodiments, but also to a case where an optical analysis or the like using fluorescence is performed. Further, for example, each of the embodiments described above has been described in detail for easy understanding of the invention, and the invention is not necessarily limited to the one including all the components described above. In addition, a part of the configuration of one embodiment can be replaced with the configuration of another embodiment, and the configuration of another embodiment can also be added to the configuration of one embodiment. In addition, a part of the configuration of each of the embodiments may be added to, deleted from, or replaced with another configuration.

REFERENCE SIGN LIST

001 . . . arithmetic expression, 10 . . . optical measurement system, 010X, 010Y . . . measurement site, 11 . . . network, 20, 30, 40 . . . optical measurement system, 100 . . . optical measurement instrument, 101 . . . optical analysis unit, 102 . . . arithmetic processing unit, 103 . . . display unit, 200 . . . server device, 201 . . . arithmetic expression DL information, 300 . . . reaction tank, 400 . . . pump, 500 . . . bypass tube, 800X, 800Y . . . arithmetic expression generating device, 1011 . . . light source unit, 1012 . . . light receiving unit, 1013 . . . cell holder, 1014 . . . cell, 1015 ... control unit, 1016 ... direction conversion element, 1017A to 1017D ... mirror, 1018 ... direction conversion element, 1021 ... measurement information

The invention claimed is:

1. An optical measurement instrument, comprising:
an optical analysis unit configured to perform an optical analysis on a specimen and measure an intensity of light as a result of the optical analysis; and
an arithmetic processing unit configured to receive a selection of a target substance and an item of quantitative analysis of the target substance from a user, download an arithmetic expression from a server device via a network wherein the arithmetic expression is chosen from among a plurality of arithmetic expressions stored in the server device based on the selection of the user, and perform a quantitative analysis on the target substance contained in the specimen by substituting the result of the optical analysis by the optical analysis unit into the arithmetic expression.

2. The optical measurement instrument according to claim 1, comprising:
a display unit configured to display a result of the quantitative analysis of the target substance by the arithmetic processing unit.

3. The optical measurement instrument according to claim 2, wherein
the arithmetic processing unit downloads a plurality of arithmetic expressions from the server device, and acquires results of a plurality of quantitative analyses by substituting the result of the optical analysis by the optical analysis unit into the plurality of arithmetic expressions, and
the display unit displays results of a plurality of quantitative analyses of the target substance by the arithmetic processing unit.

4. The optical measurement instrument according to claim 3, wherein
the arithmetic processing unit uses the arithmetic expression corresponding to the result selected by a user, among the results of the plurality of quantitative analyses of the target substance by the arithmetic processing unit, which is displayed on the display unit, for a subsequent quantitative analysis, discards the arithmetic expression corresponding to the result not selected by the user, and notifies the server device of information representing the discarded arithmetic expression.

5. The optical measurement instrument according to claim 1, wherein
the optical analysis unit includes:
a light source unit configured to emit light;
a cell into which the specimen is allowed to flow; and
a light receiving unit configured to measure an intensity of the light emitted from the light source unit and transmitted through the cell, and
the arithmetic processing unit performs a quantitative analysis on the target substance contained in the specimen by substituting an intensity of the light when the specimen is flowing into the cell and an intensity of the light when the specimen is not flowing into the cell into the arithmetic expression.

6. The optical measurement instrument according to claim 5, wherein
the optical analysis unit includes
two of the cells, and
the arithmetic processing unit performs a quantitative analysis on the target substance contained in the specimen by substituting an intensity of the light transmitted through one of the two cells into which the specimen is flowing and an intensity of the light transmitted through another cell into which the specimen is not flowing into the arithmetic expression.

7. The optical measurement instrument according to claim 6, wherein
the optical analysis unit includes
a direction conversion element configured to switch a traveling direction of the light emitted from the light source unit to one of the two cells.

8. The optical measurement instrument according to claim 5, wherein
the optical analysis unit measures the intensity of the light again when the specimen is not flowing into the cell when at least one of the light source unit and the light receiving unit is deteriorated.

9. The optical measurement instrument according to claim 1, wherein
the arithmetic processing unit downloads the arithmetic expression from the server device existing on a cloud network.

10. The optical measurement instrument according to claim 1, wherein
the arithmetic processing unit downloads the arithmetic expression from the server device on a remote system via the network.

11. An optical measurement method using an optical measurement system including an optical measurement instrument and a server device, the method comprising:
a request step of connecting to the server device via a network, receiving a selection of a target substance and an item of quantitative analysis of the target substance from a user, and requesting an arithmetic expression by the optical measurement instrument;
a selecting step of selecting the arithmetic expression from among a plurality of arithmetic expressions stored in the server device based on the selection of the user;
a transmitting step of transmitting the arithmetic expression in response to a request from the optical measurement instrument by the server device;
a receiving step of receiving the arithmetic expression transmitted from the server device by the optical measurement instrument;
an optical analysis step of performing an optical analysis on a specimen and measuring an intensity of light as a result of the optical analysis by the optical measurement instrument; and
an arithmetic processing step of performing a quantitative analysis on a target substance contained in the specimen by substituting the result of the optical analysis into the arithmetic expression by the optical measurement instrument.

* * * * *